Oct. 3, 1933. L. RICH Re. 18,961
SEWING MACHINE
Original Filed March 31, 1932
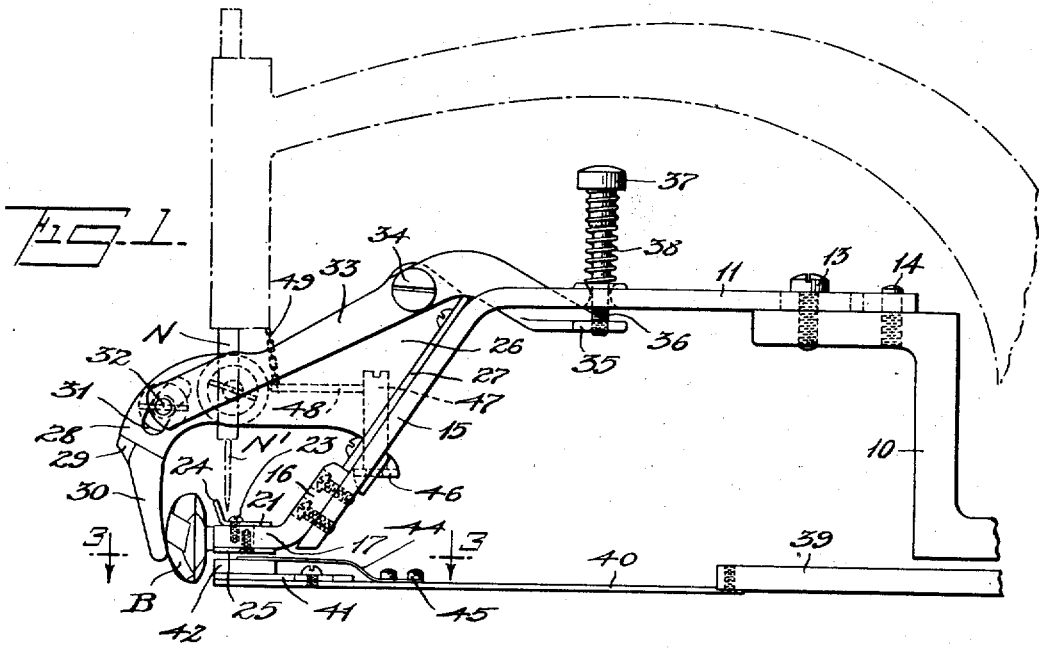
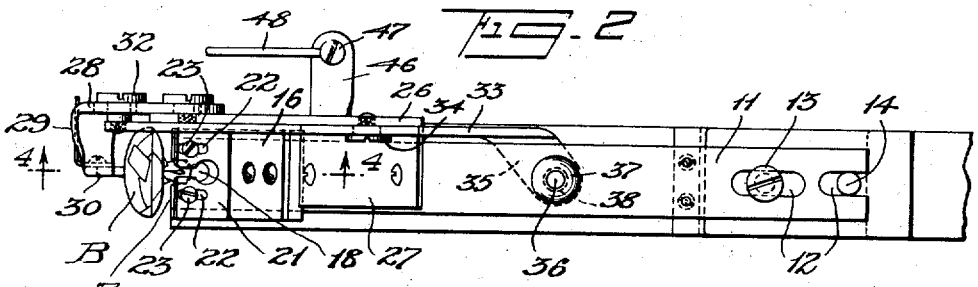
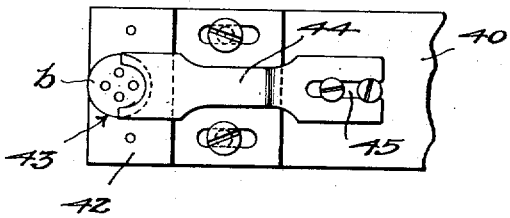
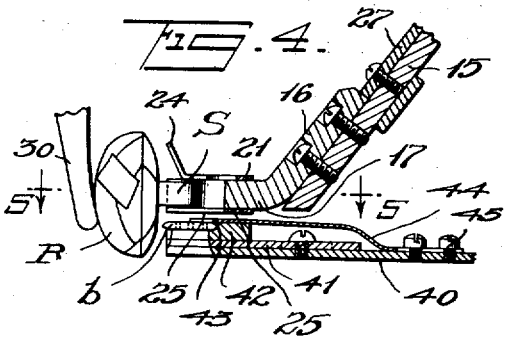
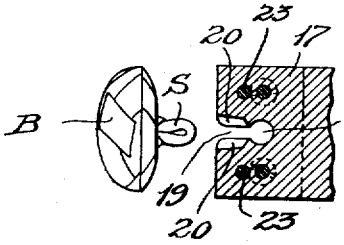
FIG. 5.
INVENTOR
Louis Rich.
BY
ATTORNEY Reissued Oct. 3, 1933

Re. 18,961

UNITED STATES PATENT OFFICE 18,961

SEWING MACHINE

Louis Rich, New York, N. Y.

Original No. 1,879,709, dated September 27, 1932, Serial No. 602,357, March 31, 1932. Application for reissue December 19, 1932. Serial No. 648,024

6 Claims. (Cl. 112—108)

This invention relates to sewing machines and has special reference to a button sewing attachment for sewing machines particularly adapted to sewing buttons having leather shanks onto articles of clothing.

One important object of the invention is to provide an improved general construction of device for this purpose.

A second important object of the invention is to provide an improved means, in such a device, for properly holding the button to present the shank of the button in position for sewing.

A third important object of the invention is to provide means for holding the so-called stay button in place.

A fourth important object of the invention is to provide novel means for releasing the button holding means of the device.

With the above and other objects in view, as will presently be explained, the invention consists in general of certain novel details of construction and combinations of parts, hereinafter fully described, illustrated in the accompanying drawing, and specifically claimed.

In the accompanying drawing the characters of reference indicate like parts in the several views, and:

Figure 1 is a side elevation of the invention with certain parts of a sewing machine shown in broken lines in relation thereto.

Figure 2 is a plan view of the invention.

Figure 3 is an enlarged detail, on the line 3—3 of Figure 1, and showing the means for holding the stay button.

Figure 4 is an enlarged detail section, on the line 4—4 of Figure 2.

Figure 5 is an enlarged detail section on the line 5—5 of Figure 4.

In the present embodiment of the invention there is provided a bracket 10 of Z-shape and which has its lower flange suitably supported to reciprocate on the bed (not shown) of the machine when the attachment is in use. On the upper flange of the bracket rests one end 11 of a button carrier supporting bar which is provided with longitudinally extending slots 12. Through one of these slots extends a clamp screw 13 and in the other slot is received a guide pin 14. By this means the supporting bar may be adjusted on the bracket 10. The free end of the supporting bar is inclined downwardly, as at 15, and to the lower part of this end is secured the upwardly inclined shank portion 16 of a button shank holder having a horizontal body portion 17. The body 17 is provided with a vertical needle opening 18 at about its center and leading from this opening is a slot 19 which opens through the free edge of the body and is provided with horizontal opposed notches 20 to receive the shank S of a button B. The opening and slot thus form a keyhole slot having opposed notches in the walls of its stem portion.

Mounted on top of the body 17 is a guard plate 21 having slots 22 through which pass securing screws 23. This plate has an upturned edge portion 24 extending over the free edge of the body 17 to protect and support the button against tilting. A second guard or wear plate 25 is secured beneath the body 17 and both of these guard plates are slotted with keyhole slots similar to the body.

At 26 is a bracket in the form of a vertical plate and which is provided with a foot 27 resting on the bar portion 15 and secured thereto by suitable screws. The bracket 26 is spaced from the side of the bar 15. The free end of this bracket lies behind the needle bar N of the machine and to this free end is pivoted one end of a clamp member 28 having a forwardly extending arm 29 provided with a button holding finger 30 arranged to press normally against the top of the button B and hold it in position. In the clamp member is formed a cam slot 31 wherein works a cam pin 32 carried by one end of a release lever 33 which is pivoted intermediate its ends to the bracket 26, as at 34. The other end of this lever is provided with a foot 35 which extends beneath the bar portion 11. Extending upwardly from this foot is a pin 36 which passes through a suitable opening in the bar 11 and is provided on its upper end with a head 37. A spring 38 surrounds the pin between the head 37 and the bar 11 and urges this end of the lever upwardly and the opposite end downwardly so as to force the finger 30 against the button B. Obviously, downward pressure on the head 37 will release the button.

Below the bracket 10 is an operating arm 39 to which is fixed a blade or extension 40 which terminates in alignment with the free edge of the body 17. Mounted on the free end of this blade is a plate 41 which has screw and slot connection with the blade to permit adjustment of the plate longitudinally of the blade. On this plate beneath the body 17 is fixed a stay button holder 42 having a suitable pocket 43 for a stay button b and slotted similarly to the body 17. Overlying a portion of the pocket 43 is a spring clamp 44 which is connected to the blade 40 by a screw and slot connection 45 so that the clamp 44 may be suitably adjusted with relation to the button pocket 43.

Fixed to the bar portion 15 is a rearwardly extending bracket 46 which carries at its rear end a post 47 suitably connected to the presser foot bar (not shown) of the machine, as by the arm 48 and chain 49.

As is common in button sewing machines, the bracket 10 and bar 39 are reciprocated by suitable mechanism to enable the needle N′ to pass through the loop of the button shank on one reciprocation and outside such loop on the second reciprocation, thus passing through the openings of the stay button alternately. This reciprocating means forms no part of the invention and consequently is not here shown.

In operation, the head 37 is pushed down and the finger 30 raised. The button B is now positioned as shown in Figures 1 and 4 and the finger released. Also the button *b* is placed in position. The fabric is now inserted between the body 17 and member 42 and the sewing operation carried out. When this is finished the finger 30 is again released and the button removed.

There has thus been provided a simple and efficient device of the kind described and for the purpose specified.

It is obvious that changes may be made in the form and construction of the invention without departing from the principles involved. It is not, therefore, desired to confine the invention to the exact form herein shown and described but it is desired to include all such as properly come within the scope claimed.

Having thus described the invention, what is claimed as new, is:

1. In a device of the kind described, a button holding member including a body having a keyhole needle slot therein opening through the free edge of the body and having its side walls provided with opposed button shank receiving grooves at the open end, a supporting bar carrying said body, a bracket carried by said bar, a presser arm pivoted to said bracket and having a finger positioned opposite the open end of said slot, and spring means urging the finger toward the body.

2. In a device of the kind described, a button holding member including a body having a keyhole needle slot therein opening through the free edge of the body and having its side walls provided with opposed button shank receiving grooves at the open end, a supporting bar carrying said body, a bracket carried by said bar, a presser arm pivoted to said bracket and having a finger positioned opposite the open end of said slot, a lever pivoted intermediate its ends to said bracket, a pin and slot connection between one end of said lever and said arm whereby to move said arm on its pivot as the lever is rocked, and spring means urging said lever to move the finger toward said body.

3. In a device of the kind described, a stay button holder including a blade, a body having a button recess therein, means to secure said body for adjustment on said blade, a button holding spring having one end overlapping said recess, and means to secure said spring adjustably along said blade.

4. In a device of the kind described, a button holding member including a body having a needle slot therein opening through the free edge of the body and having its side walls provided with opposed button shank receiving means at the open end, a supporting bar carrying said body, a bracket carried by said bar, a presser arm carried by said bracket and having a finger positioned opposite the open end of said slot, and spring means urging the finger toward the body.

5. A button sewing attachment for sewing machines including a body slotted at one end to receive the shank of a button, and an arm pivotally supported from the body to swing at one end into and out of alignment with the body opposite the slot, said arm having its free end adapted to engage the button head upon its shank being inserted in the slot.

6. A button sewing attachment for sewing machines including a body slotted at one end to receive the shank of a button, an arm pivotally supported from the body to swing at one end into and out of alignment with the body opposite the slot, said arm having its free end adapted to engage the button head upon its shank being inserted in the slot, and spring means urging said free end against the button head.

LOUIS RICH.